(12) United States Patent
Gonzalez

(10) Patent No.: US 8,959,882 B2
(45) Date of Patent: Feb. 24, 2015

(54) GUIDING ELEMENT ARRANGEMENT FOR MOWER

(71) Applicant: Deere & Company, Moline, IL (US)

(72) Inventor: Ivan Alejandro Gonzalez, Monterrey (MX)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/886,818

(22) Filed: May 3, 2013

(65) Prior Publication Data

US 2013/0291512 A1    Nov. 7, 2013

(30) Foreign Application Priority Data

May 4, 2012    (DE) .................... 10 2012 207 459

(51) Int. Cl.
*A01D 67/00*    (2006.01)
*A01D 34/66*    (2006.01)
*A01D 34/71*    (2006.01)

(52) U.S. Cl.
CPC .............. *A01D 34/66* (2013.01); *A01D 34/667* (2013.01); *A01D 34/71* (2013.01)
USPC ........................................... 56/320.1; 56/255

(58) Field of Classification Search
USPC ......... 56/6, 13.3, 14.7, 320.1, 320.2, DIG. 20
See application file for complete search history.

(56) References Cited

U.S. PATENT DOCUMENTS

| | | | |
|---|---|---|---|
| 5,113,640 A | 5/1992 | Colistro | |
| 5,894,717 A | 4/1999 | Yamashita et al. | |
| 5,987,863 A * | 11/1999 | Busboom et al. | 56/320.1 |
| 6,470,663 B2 * | 10/2002 | Langworthy et al. | 56/320.2 |

(Continued)

FOREIGN PATENT DOCUMENTS

| | | |
|---|---|---|
| DE | 102008035037 A1 | 8/2009 |
| SU | 401310 | 4/1974 |
| SU | 422379 | 2/1975 |
| SU | 733544 | 5/1980 |

OTHER PUBLICATIONS

Foreign Search Report for related Eurasian Application No. 195926, dated Aug. 15, 2013.

*Primary Examiner* — Thomas B Will
*Assistant Examiner* — Mai Nguyen
(74) *Attorney, Agent, or Firm* — Quarles & Brady LLP

(57) ABSTRACT

A mower has one central and at least one laterally arranged mowing device. The mowing devices each have a mower structure having mowing knives that are drivable in rotation underneath the mower structure about a vertical rotation axis. The ends of the mowing knives describe a circular path, and a guiding element is arranged on at least one laterally arranged mowing device underneath the mower structure, the guiding element at least partially surrounding the circular path and extending downwardly from the mower structure such that cut material cut by a mowing knife is retained or guided away by the guiding element. In order to make the distribution of the mown material more regular during mowing or to avoid accumulations of mown material, the guiding element is arranged in a circular path section that is located at the front in the mowing direction and at least one recess is formed in the guiding element, the recess having a first section which is located between the central mowing device and a plane that extends in the mowing direction and in the direction of the rotation axis, and comprising a second section which is located between the same plane and one side of the mower.

4 Claims, 3 Drawing Sheets

(56) References Cited

U.S. PATENT DOCUMENTS

| | | | |
|---|---|---|---|
| 6,681,553 B2* | 1/2004 | Ferree et al. | 56/320.1 |
| 7,360,352 B2* | 4/2008 | Samejima et al. | 56/320.2 |
| 2002/0104301 A1* | 8/2002 | Langworthy et al. | 56/320.2 |
| 2004/0006960 A1* | 1/2004 | Samejima et al. | 56/14.7 |
| 2006/0230735 A1* | 10/2006 | Samejima et al. | 56/320.2 |
| 2009/0178382 A1* | 7/2009 | Sugio et al. | 56/320.2 |
| 2009/0249764 A1* | 10/2009 | Butler et al. | 56/320.1 |
| 2009/0282799 A1* | 11/2009 | Kure et al. | 56/320.2 |

* cited by examiner

GUIDING ELEMENT ARRANGEMENT FOR MOWER

FIELD OF THE DISCLOSURE

A mower having one central and lateral mowing devices, wherein the mowing devices each comprise a mower structure having mowing knives that are drivable in rotation on the underside of the mower structure about a vertical rotation axis, the ends of the mowing knives describing a circular path, and wherein a guiding element is arranged on at least one lateral mowing device underneath the mower structure, the guiding element at least partially surrounding the circular path and extending downwardly from the mower structure such that cut material cut by a mowing knife is retained or guided away by the guiding element.

BACKGROUND OF THE DISCLOSURE

Mowers of the above-described kind are known and are used for mowing, cutting and harvesting a wide variety of types of mown or cut agricultural material. Mowers of this kind can be operated for example as pulled implements mounted on the trailer coupling of a tractor. Depending on size, the mowers have a plurality of mowing devices arranged alongside one another, which each comprise a mowing structure on which discs equipped on the underside with mowing knives are arranged, the discs each being driven in rotation about a rotation axis via the power take-off shaft of the tractor and via correspondingly arranged drive trains. The mowing knives guided on the discs are guided in a circular path in which the mown or cut material is cut. Thus, for example mowers having one central and two lateral mowing devices are known, wherein the lateral mowing devices are formed with wing-like mowing structures which are swung up for transporting purposes and can be lowered for operating purposes. As a rule, in the case of the lateral mowing devices the mowing knives rotate in opposite directions of rotation such that the cut material is conveyed towards the middle. The mowing devices can be equipped with guiding elements or guiding plates which are arranged underneath the mowing structures and by way of which the ejection, brought about by the rotation of the mowing knives, of the cut material can to a certain extent be influenced or guided, or uncontrolled ejection can be prevented. As a result, accumulations in the form of a swath of cut or mown cut material can be created in a preferential or targeted manner and be picked up by an implement running behind, for example a baler. However, for other fields of application, swath formation is actually obstructive and therefore undesired, for example during mowing or shredding of crop residues, which, although they are incorporated into the soil when the field is replanted or are mown down or cut prior to replanting, are not intended to be gathered up. Here, it is desirable to achieve a distribution of the mown or cut material that is as regular as possible over the entire mown area, in order to inhibit the subsequent replanting process as little as possible.

A mower that is designed for such fields of application is disclosed for example in DE 10 2008 035 037 A1. A mower having one central and two laterally arranged mowing devices is described. In order to achieve a distribution of mown or cut material that is as regular as possible over the mown area, guiding plates are arranged underneath the mowing structures such that they are arranged only partially along the circular paths described by the mowing knives or only partially surround such a circular path. The guiding plates extend downwardly from the mowing structure and are wherein at the lateral mowing structures they surround the respective circular path described by the mowing knives only along a relatively short section in a rear lateral region of a guiding plate. Furthermore, at the central mowing structure there is arranged a guiding plate that is open at the front in the mowing direction, the guiding plate being formed in the rear and the lateral regions of the circular path and being mounted on the mowing structure in a vertically adjustable manner. Largely regular distribution of the mown cut material can be achieved as a result, wherein there is furthermore space for optimization, in particular over the entire mown area.

SUMMARY OF THE DISCLOSURE

The object underlying the disclosure is considered that of specifying a mower of the type mentioned at the beginning, by way of which the regular distribution of mown material is optimized further.

According to the disclosure, a mower of the type mentioned at the beginning comprises a guiding element which is arranged in a circular path section that is located at the front in the mowing direction, wherein at least one recess is formed in the guiding element, the recess comprising a first section which is located between a plane that extends in the mowing direction and in the direction of the rotation axis and the central mowing device, and comprising a second section which is located between the same plane and a side of the mower. A circular path section that is located at the front in the mowing direction is understood to be a circular path section which, as seen in the mowing direction, is located in front of a plane which extends transversely to the mowing direction and in the direction of the rotation axis. On account of the fact that the recess has a first and a second section, the deposition of cut material underneath the mower structure can be influenced optimally, such that cut material is let through in a particular pre-determinable amount and for a particular region of the circumference or is held in a targeted manner in a different region or is deflected. As a result, regular distribution of the mown or cut material over an entire deposition area is achieved. Irregular accumulations of cut material are avoided. Preferably, the two lateral mowing devices are provided with a guiding element of the abovementioned type.

The first and second sections may also have differently shaped contours, such that as a result even more regular distribution of the mown material can be expected. In particular, the shape of the contour can in this case play a significant part. It is possible to determine which contours are optimal for the individual sections and for the particular cut material and the particular mowing conditions by appropriate field trials.

The contours of the first and second sections of the recess can have for example different curvatures and profiles, wherein the shape of the contour of the first section represents a region of the recess that cuts in more deeply from the lower rim of the guiding element compared with the shape of the contour of the second section. The sections can also be formed with different lengths from one another, such that for example the contour of the first section has a longer and flatter profile and that of the second section has a shorter and more curved profile.

It is also possible for the sections to merge into one another, such that the first section leads directly into the second section.

The guiding element may comprise a plurality of guiding element parts, wherein the first and/or the second section is formed in one of the guiding element parts. Accordingly, the guiding element can be formed by a plurality of segments of a guiding plate, wherein one segment represents a partial element and covers a particular region of the circular path. The sections of the recess can in this case be formed on a segment or also be distributed over a plurality of segments. It is possible, by replacing only one segment having a particular contour for one section with a segment having a different contour for one section, to change the recess as such and adapt it to the changing conditions and operating states. The guiding element or the guiding element parts or segments can be formed as bent sheets made of metal, plastics material or else of an elastic material such as rubber or the like.

Furthermore, it is possible to provide a further guiding element which is arranged in a circular path section located towards the central mowing device and adjoins the first guiding element. In particular, in this way the cut material cut by the mowing knives can be prevented from getting into a region located in the central mowing device and forming accumulations. Accumulations of cut material are avoided. The two lateral mowing devices can be provided with such a further guiding element.

BRIEF DESCRIPTION OF THE DRAWINGS

Embodiments of the disclosure are described in detail below with reference to the accompanying drawings, wherein.

DETAILED DESCRIPTION OF THE DRAWINGS

Figure 1:
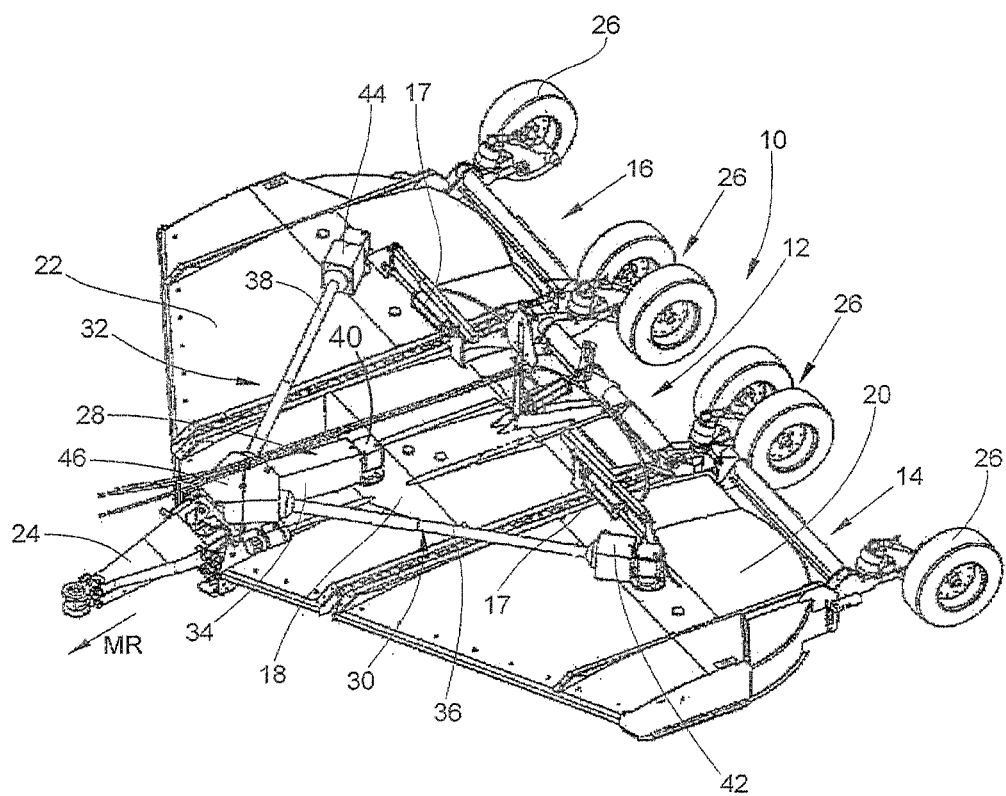
FIG. 1 is a schematic perspective side view of a mower according to the disclosure from the front and above.

FIG. 1 shows a mower 10 for attaching to an agricultural tractor (not shown). The mower 10 comprises a central mowing device 12 which is adjoined on both sides in each case by a lateral mowing device 14, 16. The lateral mowing devices 14, 16 are formed as wing-like structures and are arranged pivotably on the central mowing device in such a manner that they can be raised or swung up from an operating position for mowing into a transporting position for transporting and vice versa by way of actuators 17 or motors, for example hydraulic cylinders. Each of the mowing devices 12, 14, 16 comprises in each case a mower structure 18, 20, 22. The mowing device 14 that is located on the left in FIG. 1 as seen from above in the mowing direction MR, or the mower structure 20 located correspondingly on the left, is described in detail in the following text with reference to the illustration in FIG. 2.

The central mower structure 18 is equipped with a drawbar 24 which is connectable to a trailer coupling (not shown) of the tractor and via which the mower 10 is supported at its front end on the tractor. At the rear end of the mower 10, running wheels 26, by way of which the mower 10 is guided over the ground, are arranged on the individual mowing devices 12, 14, 16.

Each mowing device 12, 14, 16 comprises a separate drive train 28, 30, 32 having in each case a drive shaft 34, 36, 38 and an angular transmission system 40, 42, 44. The drive shafts 34, 36, 38 lead together into a power split transmission 46 that is drivable by a power take-off shaft (not shown) of the tractor.

Figure 2:
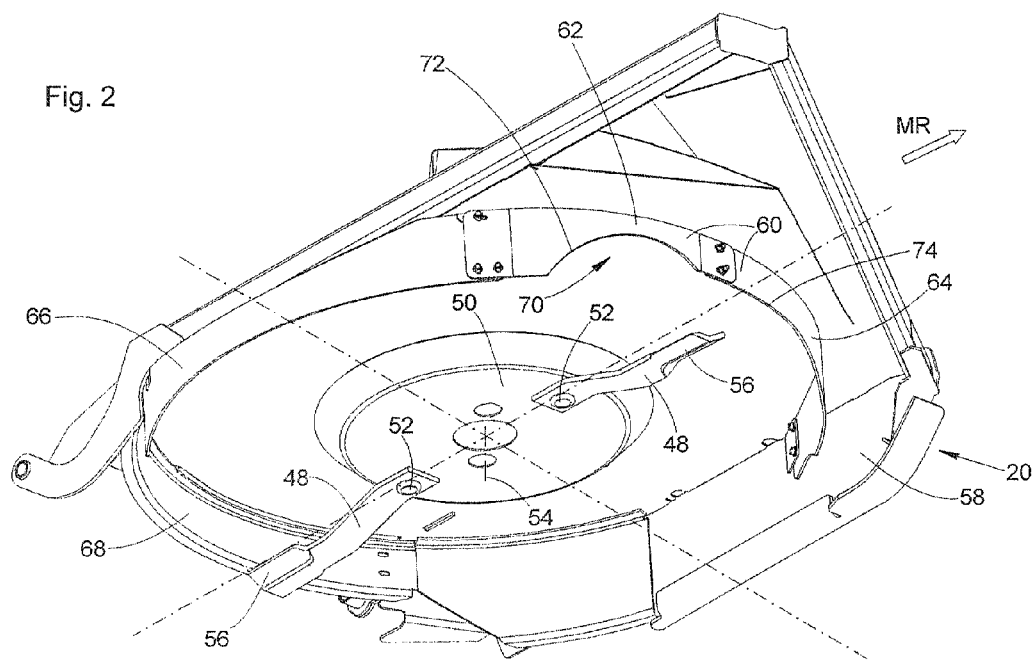
FIG. 2 is a schematic perspective side view of a mower structure, arranged on the left-hand side as seen in the mowing direction, of the mower from FIG. 1, from the front and below.

The respective angular transmissions 40, 42, 44 drive mowing knives 48 located underneath the individual mower structures 18, 20, 22, see FIG. 2 as an example. The mowing knives 48 are mounted on a mowing or rotary disc 50 in a pivotable manner by way of pivoting bolts 52 and are oriented radially outwards by a centrifugal force that acts on them. The respective rotary discs 50 are drive-connected to the correspondingly associated angular transmissions 40, 42, 44. The mowing knives 48 can also be designed in the form of a propeller, such that the mowing knives 48 can alternatively also be driven directly via a drive spindle on the propeller. The mowing knives 48 and the rotary discs 50 rotate about a rotation axis 54, wherein the ends 56 of the mowing knives 48 describe a circular path. To the side of the mower structure 20 there is formed a side wall 58 which extends downwardly (towards the ground) underneath the mower structure 20, the side wall 58 bounding or shielding the mower structure 20 laterally towards the outside in a lateral section of the circular path. The side wall 58 is adjoined at the front of the mower 10 by a first guiding element 60 in the form of a ring segment. The guiding element 60 is designed in the form of a guiding plate made of metal, preferably from sheet steel. A robust plastics material or a rubber mat could also be used here. The guiding element 60 likewise extends downwardly underneath the mower structure 20 and represents a boundary or shield, which extends over a front section, not shielded by the side wall 58, of the circular path described by the rotating ends 56 of the mowing knives 47.

Figure 3:
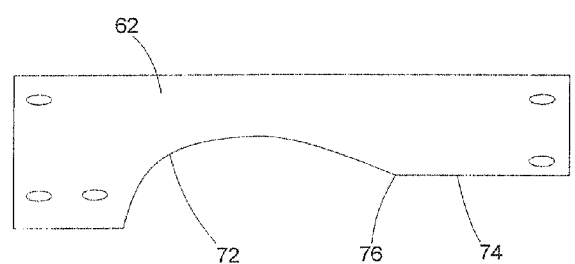
FIG. 3 is a schematic side view of a guiding element having a first section.
Figure 4:
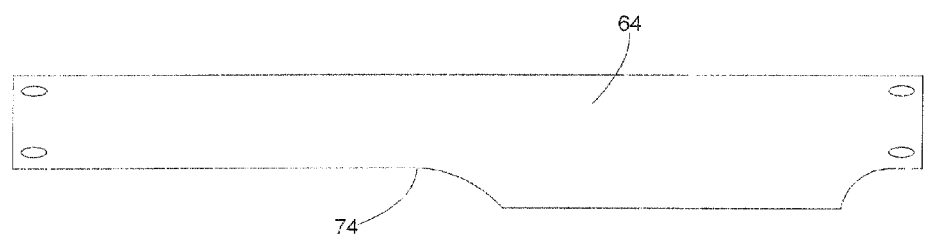
FIG. 4 is a schematic side view of a guiding element having a second section.

The guiding element 60 comprises two or more guiding element parts 62, 64, of which the guiding element parts 62, 64 extend over a section of the circular path which is located in front of the rotation axis with respect to the mowing direction MR. A further rear side wall 68 extends from the side wall 58 about a rear section of the described circular path of the mower structure 20. A further (second) guiding element 66 extends over a section of the circular path which extends between the first guiding element 60 and the rear side wall 68 and thus bounds or shields a section of the circular path towards the central mowing device 12, the section being located partially in front of the rotation axis 54 and partially behind the rotation axis 54. The further (second) guiding element 66 can in this case directly adjoin the first guiding element 60. The rear side wall 68 delimits a circular path section located behind the rotation axis 54 or shields such a section. Furthermore, the guiding element parts 62 and 64 are arranged such that the guiding element part 64 encloses or shields a section of the circular path which extends in front of the rotation axis 54 and towards the central mowing device 12, and such that the guiding element part 64 mainly encloses or delimits a section of the circular path which extends in front of the rotation axis 54 and towards the side of the mower 10. The formulations "in front of the rotation axis 54" and "behind the rotation axis 54" should be understood as the definition of a region which, as seen in the mowing direction MR, is located respectively in front of or behind the plane which extends transversely to the mowing direction MR and on the rotation axis 54. The guiding element parts 62, 64 (which form the guiding element 60) and the further guiding element 66 are formed in the present exemplary embodiment as segments or elements (parts) of an assembled guiding plate. However, the guiding element 60 can also be formed in one piece and have a plurality of sub-regions which are formed or arranged in a manner corresponding to the above-described guiding element parts 62, 64. Formed on the guiding element 60 is a recess 70 which is open towards the ground, that is to say downwardly, or a cutout which is open towards the ground, the recess 70 or cutout comprising a first section 72 and a second section 74 (see in particular FIGS. 3 and 4 in conjunction with FIG. 2). The first section 72 is located in the guiding element part 62 and thus extends in front of the rotation axis 54, between the central mowing device 12 and the plane which extends on the rotation axis 54 and in the mowing direction MR. The second section 74 is located partially in the guiding element part 62 but mainly in the guiding element part 64 and thus extends mainly in the mowing direction MR in front of the rotation axis 54, between the side of the mower 10 and the plane which extends on the rotation axis 54 and in the mowing direction MR. In other words, the sections 72 and 74 bound one another and are separated by the plane which extends on the rotation axis 54 and in the mowing direction MR. In the present exemplary embodiment, the sections 72, 74 are formed in different manners and are complementary to an asymmetrical recess 70 or to an asymmetrical cutout. However, with appropriate shaping of the sections 72, 74, the recess 70 or the cutout can also be formed in a symmetrical manner. However, trials have shown here that the configuration of the recess 70 or cutout with differently configured sections 72, 74 provides improved results with regard to regularity of distribution of mown material. Thus, the recess 70 or the cutout has in the first section 72 a contour that extends more deeply and in a more curved manner than in the second section 74, while in the second section 74 a contour profile which is overall longer but flatter than in the first section 72 is formed. In other words, the shape of the contour in the first section 72 represents a recess 70 or cutout that cuts in more deeply, starting from the lower rim (from the rim directed towards the ground) of the guiding element 60, compared with the shape of the contour in the second section 74 (see in particular the illustration in FIGS. 3 and 4). The sections 72, 74 are formed such that they merge into one another at a contour changing point 76.

Having described the preferred embodiment, it will become apparent that various modifications can be made without departing from the scope of the invention as defined in the accompanying claims.

The invention claimed is:

1. A mower having one central mowing device and at least one laterally arranged mowing device, wherein the mowing devices each comprise a mower structure having mowing knives that are driven in rotation on the underside of the mower structure about a vertical rotation axis, the ends of the mowing knives describing a circular path, and wherein a first guiding element is arranged on the at least one laterally arranged mowing device underneath the mower structure, the first guiding element at least partially surrounding the circular path and extending downwardly from the mower structure such that cut material cut by one of the mowing knives is one of retained and guided away by the first guiding element, wherein the first guiding element is arranged in a circular path section that is located at the front in the mowing direction and at least one recess is formed in the first guiding element, the recess comprising a first section which is located between the central mowing device and a first plane that extends in the mowing direction and through the rotation axis of the at least one laterally arranged mowing device, and comprising a second section which is located between the first plane and a side of the mower at a side of the at least one laterally arranged mowing device opposite the central mowing device, wherein the first section and the second section are located at least partially between the front of the mower and a second plane that extends perpendicular to the first plane and through the rotation axis of the at least one laterally arranged mowing device, wherein the first and second sections of the recess have different contours, wherein the contour of the first section represents a curved region of the recess that cuts in more deeply from a lower rim of the guiding element compared with the contour of the second section.

2. The mower according to claim 1, wherein the first and second sections merge into one another.

3. The mower according to claim 1, wherein the first guiding element comprises a plurality of guiding element parts, wherein at least one of the first and the second section is formed in one of the guiding element parts.

4. The mower according to claim 1, wherein a second guiding element is provided, which is arranged in a circular path section located towards the central mowing device and adjoins the first guiding element.

* * * * *